United States Patent [19]

Yukimoto et al.

[11] Patent Number: 4,983,700

[45] Date of Patent: Jan. 8, 1991

[54] CURABLE POLYMER COMPOSITION

[75] Inventors: Sadao Yukimoto; Toshifumi Hirose; Hiroshi Wakabayashi; Katsuhiko Isayama, all of Kobe, Japan

[73] Assignee: Kanegafuchi Chemical Industry, Co. Ltd., Osaka, Japan

[21] Appl. No.: 363,855

[22] Filed: Jun. 9, 1989

[30] Foreign Application Priority Data

Jun. 10, 1988 [JP] Japan .................. 63-144015

[51] Int. Cl.$^5$ .............................. C08G 77/04
[52] U.S. Cl. ...................... 528/34; 525/403; 525/407; 525/409; 528/38; 528/901
[58] Field of Search ............ 525/407, 409, 403; 528/34, 38, 901

[56] References Cited

U.S. PATENT DOCUMENTS 4,788,254 11/1988 Kawakubo et al. ............ 525/106
4,906,707 3/1990 Yukimoto et al. ............. 525/409

FOREIGN PATENT DOCUMENTS 0169536 1/1986 European Pat. Off. .
0242903 10/1987 European Pat. Off. .

*Primary Examiner*—Melvyn I. Marquis

*Attorney, Agent, or Firm*—Wegner, Cantor Mueller & Player

[57] ABSTRACT

A curable polymer composition comprising:

(A) 100 parts by weight of an oxyalkylene base polymer having at least one silicon-containing group to the silicon atom of which a hydroxy group and/or a hydrolyzable group is bonded and which is cross linkable through formation of a siloxane bond, (B) 0.1 to 20 parts by weight of at least one compound selected from the group consisting of a compound having one silanol group in the molecule and a compound which, when reacted with moisture, generates a compound having one silanol group in the molecule, (C) 0.1 to 20 parts by weight of a compound having a silicon-containing group to the silicon atom of which two hydrolyzable groups are bonded and an amino group, and (D) 0.01 to 5 parts by weight of a compound having a silicon-containing group to the silicon atom of which three hydrolyzable groups are bonded and an amino group, which composition provides a cured material having low modulus, group bond strength and improved weather resistance of bond strength.

10 Claims, No Drawings

CURABLE POLYMER COMPOSITION

BACKGROUND OF THE INVENTION

1. Field of the Invention

The present invention relates to a curable polymer composition. More particularly, the present invention relates to a curable polymer composition which comprises an oxyalkylene base polymer having at least one silicon-containing group to the silicon atom of which a hydroxy group and/or a hydrolyzable group is bonded and which is cross linkable through formation of a siloxane bond (hereinafter referred to as a "silicon-containing reactive group").

2. Description of the Related Art

Oxyalkylene base polymers having the silicon-containing reactive groups are disclosed in U.S. Pat. No. 3,971,751, and one of typical examples of such polymers is a polymer of the formula:

wherein X″ is a hydrolyzable group such as a methoxy group.

The oxyalkylene base polymers having the silicon-containing reactive groups are cured through formation of siloxane bonds (Si—O—Si) between the polymer chains by the function of moisture in the air at room temperature to provide a rubbery cured material in the similar way to room temperature curable silicone rubbers. Since the cured material has good elongation properties, strength and adhesivity, it is used as a sealant, an adhesive and the like.

When the rubbery cured material is used as the sealant, it should satisfy various requirements, among which, the tensile properties and adhesivity to a substrate are important. The tensile properties include modulus, elongation, strength at break and the like, and often the rubbery cured material is required to have low modulus and large elongation, which are both characteristic properties of the rubber. The adhesivity includes bond strength and weather resistance of bond strength. The rubbery cured material is required to have large bond strength and good weather resistance of bond strength. Particularly when the rubbery cured material is used as a building sealant, it is often applied on a transparent material such as glass. Therefore, the weather resistance of bond strength, particularly the weather resistance under light illumination is important.

As a curable polymer composition which comprises the oxyalkylene base polymer having the silicon-containing reactive group and provides a cured material having low modulus, U.S. Pat. No. 4,788,254 discloses a curable polymer composition comprising said oxyalkylene base polymer, a compound having one silanol group in a molecule and/or a compound which generates a compound having one silanol group in a molecule when reacted with moisture (hereinafter referred to us "monovalent silanol compound" collectively).

To improve adhesivity of the cured material of the oxyalkylene base polymer having the silicon-containing reactive group, Japanese Patent Kokai Publication No. 182350/1982 discloses the use of a compound having a silicon atom to which a hydrolyzable group is bonded and an amino group such as γ-aminopropyltrimethoxysilane [H₂NCH₂CH₂CH₂Si(OCH₃)₃]or γ-aminopropylmethyldimethoxysilane [H₂NCH₂CH₂CH₂Si(CH₃)(OCH₃)₂].

However, the composition comprising the silicon-containing compound having three hydrolyzable groups such as γ-aminopropyltrimethoxysilane provides a cured material having large modulus. Even when such silicon-containing compound is used in combination with the monovalent silanol compound, the former deteriorates the effects of the latter. The composition comprising the silicon-containing compound having two hydrolyzable groups such as γ-aminopropylmethyldimethoxysilane does not increase modulus of a cured material but the cured material has inferior weather resistance of bond strength.

SUMMARY OF THE INVENTION

An object of the present invention is to provide a curable polymer composition which can provide a cured material (A) 100 parts by weight of an oxyalkylene base polymer having at least one silicon-containing group to the silicon atom of which a hydroxy group and/or a hydrolyzable group is bonded and which is cross linkable through formation of a siloxane bond, (B) 0.1 to 20 parts by weight of at least one compound selected from the group consisting of a compound having one silanol group in the molecule and a compound which, when reacted with moisture, generates a compound having one silanol group in the molecule, (C) 0.1 to 20 parts by weight of a compound having a silicon-containing group to the silicon atom of which two hydrolyzable groups are bonded and an amino group, and (D) 0.01 to 5 parts by weight of a compound having a silicon-containing group to the silicon atom of which three hydrolyzable groups are bonded and an amino group.

DETAILED DESCRIPTION OF THE INVENTION

The oxyalkylene base polymer having the silicon-containing reactive group (hereinafter referred to as "oxyalkylene base polymer (A)") are disclosed in U.S. Pat. Nos. 3,971,751, 3,979,384 and 4,323,488 the disclosures of which are hereby incorporated by reference, Japanese Patent Publication Nos. 36319/1970, 12154/1971 and 32673/1974, and Japanese Patent Kokai Publication Nos. 156599/1975, 73561/1976, 6096/1979, 82123/1980, 123620/1980, 125121/1980, 131022/1980, 135135/1980 and 137129/1980.

The backbone of the oxyalkylene base polymer (A) generally comprises repeating units of the formula:

wherein $R^1$ is a substituted or unsubstituted divalent hydrocarbon group having 1 to 12 carbon atoms, preferably 1 to 8 carbon atoms. Although the backbone of the oxyalkylene base polymer (A) may consists of the repeating units of the formula: —R¹—O—, it may comprise other repeating units. When the other repeating units are contained, the content of the repeating units —R¹—O— is at least 60% by weight, preferably at least 80% by weight.

Preferably, $R^1$ is a substituted or unsubstituted divalent alkylene group having 2 to 5 carbon atoms, particularly 3 or 4 carbon atoms. Specific examples of $R^1$ is —CH(CH₃)—CH₂—, —CH(C₂H₅)—CH₂—, —C(CH₃-

)$_2$—CH$_2$—, —(CH$_2$)$_4$—, etc. Among them, —CH(CH$_3$)—CH$_2$— is particularly preferable. The backbone of the oxyalkylene base polymer (A) may consists of only one kind of the repeating unit, although it may consists of two or more kinds of the repeating units.

The silicon-containing reactive group bonded to the backbone of the polymer (A) is a well known functional group and has such characteristic that it is cross linkable at room temperature. One of the typical silicon-containing reactive groups is represented by the formula:

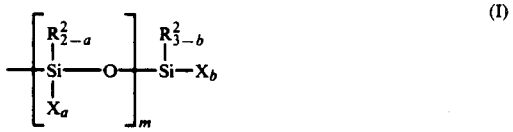

wherein $R^2$ is a substituted or unsubstituted C$_1$–C$_{40}$ organic group; X is a hydroxyl group or a hydrolyzable group; a is 0, 1 or 2; b is 0, 1, 2 or 3; and m is an integer of 0 to 19, provided that when two or more $R^2$ groups are present, they may be the same or different, that when two or more X' substituents are present, they may be the same or different, that the sum of a and b is not less than 1 (one), that when m is not less than 2, the kinds of the repeating units in the brackets may be the same or different. Among the silicon-containing reactive groups (I), a group of the formula:

wherein $R^2$ is the same as defined above and l is 1, 2 or 3 is preferred.

Specific examples of the hydrolyzable group X in the formula (I) are halogen atoms (e.g. chlorine), a hydrogen atom, alkoxy groups (e.g. a methoxy group and an ethoxy group), acyloxy groups (e.g. an acetoxy group), ketoximate groups, (e.g. a dimethylketoximate group), amino groups (e.g. a dimethylamino group), amide groups (e.g. an N-methylacetamide group), aminoxy groups (e.g. a dimethylaminoxy group), mercapto groups (e.g. a thiophenoxy group), alkenyloxy groups (e.g. an isopropenyloxy group), and the like. Among them, the alkoxy groups such as the methoxy group and the ethoxy group are preferred in view of their mild hydrolyzability.

An example of the $R^2$ group in the formula (I) is a substituted or unsubstituted C$_1$–C$_{40}$, preferably C$_1$–C$_{20}$ hydrocarbon group or a triorganosiloxy group. Specific examples of the $R^2$ group are substituted or unsubstituted alkyl groups (e.g. a methyl group, an ethyl group and a chloromethyl group), cycloalkyl groups (e.g. a cyclohexyl group), alkenyl groups (e.g. a vinyl group), substituted or unsubstituted aryl groups (e.g. a phenyl group, a tolyl group and a chlorophenyl group) and aralkyl groups (e.g. a benzyl group), and further a triorganosiloxy group of the formula:

(R')$_3$SiO— wherein R' groups are the same or different and each a substituted or unsubstituted monovalent organic group having 1 to 20 carbon atoms such as a methyl group and a phenyl group. Among these groups, the methyl group is preferable as the $R^2$ group.

The oxyalkylene base polymer (A) may have at least one silicon-containing reactive group in a molecule. In view of preferable curing properties, the polymer (A) has 1.1, preferably 1.5 to 4 silicon-containing reactive groups on the average in a molecule. Preferably, the silicon-containing reactive group is bonded to the molecule end of the oxyalkylene base polymer (A).

The oxyalkylene base polymer (A) preferably has a number average molecular weight of 3,000 to 30,000, more preferably 5,000 to 15,000. The oxyalkylene base polymers (A) may be used independently or a mixture of two or more of them.

The oxyalkylene base polymer (A) may be prepared by various methods. For example, the oxyalkylene base polymer having a first functional group Y is reacted with a compound having the silicon-containing reactive group and a second functional group Y' which reacts with the first functional group Y, whereby the silicon-containing reactive group is introduced in the oxyalkylene base polymer.

Specific manners for such reaction are as follows:

(1) The oxyalkylene base polymer having unsaturated groups is reacted with a hydrosilane compound having the hydrolyzable group such as HSi(OCH$_3$)$_3$ in the presence of a catalyst such as a compound of a metal of the VIII group of the periodic table (hydrosilylation).

Example of the hydrosilylation reaction

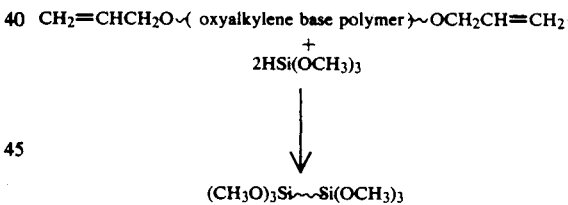

(2) The oxyalkylene base polymer having unsaturated groups is addition reacted with a compound having the silicon-containing reactive group and a mercapto group such as HS(CH$_2$)$_3$Si(OCH$_3$)$_3$.

(3) The oxyalkylene base polymer having isocyanate groups with a compound having the silicon-containing reactive group and an active hydrogen-containing group such as H$_2$N(CH$_2$)$_3$Si(OCH$_3$)$_3$.

EXAMPLE OF THE REACTION

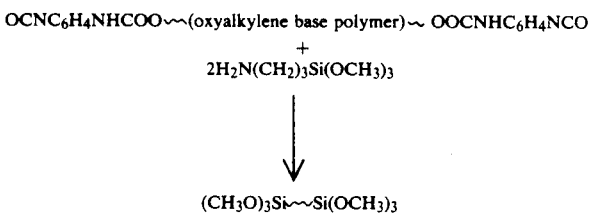

(4) The oxyalkylene base polymer having hydroxy groups is reacted with a compound having the silicon-containing reactive group and the isocyanate groups such as OCN—(CH$_2$)$_3$Si(CH$_3$)$_3$.

Among these methods, the reaction of the oxyalkylene base polymer having the unsaturated groups with the hydrosilane compound is often used. The oxyalkylene base polymer having the unsaturated groups may be prepared by introducing the unsaturated groups with the use of hydroxy groups of the oxyalkylene base polymer having the hydroxy groups (cf. Japanese Patent Kokai Publication No. 6097/1979).

The oxyalkylene base polymer (A) to be used in the present invention is not limited to those prepared by the above described methods, and those prepared by any other methods can be used. The oxyalkylene base polymer (A) further includes an oxyalkylene base polymer the backbone of which is modified. Examples of such polymer are a polymer obtainable by polymerizing a polymerizable monomer in the presence of the oxyalkylene base polymer (A) and a polymer obtainable by introducing the silicon-containing reactive group in a polymer obtained by polymerizing a polymerizable monomer in the presence of the oxyalkylene base polymer having the hydroxy groups.

The curable polymer composition of the present invention contains at least one monovalent silanol compound selected from the group consisting of the compound having one silanol group in a molecule and the compound which generates a compound having one silanol group in a molecule when reacted with moisture. By the use of the monovalent silanol compound, the modulus of the cured material of the oxyalkylene base polymer (A) can be decreased. The monovalent silanol compound is easily available and achieves such effect by simply adding it to the curable composition of the oxyalkylene base polymer (A).

As the compound having one silanol group in a molecule, any compound having one group of the formula: ≡SiOH can be used. Specific examples of such compound are compounds of the formula:

(R$^3$)$_3$SiOH wherein R$^3$ are the same or different and are substituted or unsubstituted alkyl group having 1 to 20 carbon atoms or a substituted or unsubstituted aryl group having 6 to 20 carbon atoms such as (CH$_3$)$_3$SiOH, (CH$_3$CH$_2$)$_3$SiOH, (CH$_3$CH$_2$CH$_2$)$_3$—SiOH, (C$_6$H$_5$)$_3$SiOH, (CH$_3$)(C$_6$H$_5$)$_2$SiOH and (CH$_3$)$_2$(C$_6$H$_5$)SiOH; cyclic polysiloxanes such a

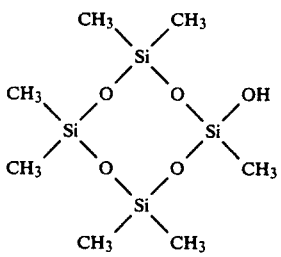

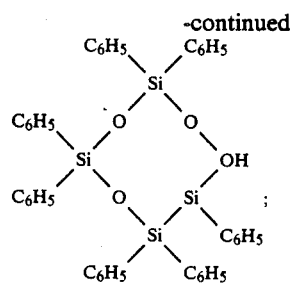

linear polysiloxanes of the formula:

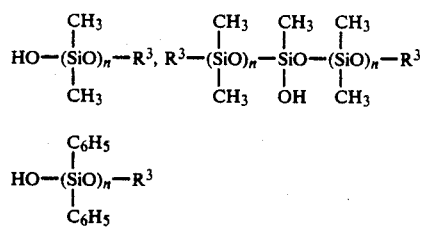

wherein R$^3$ is the same as defined above and n is an integer of 0 to 40. Among them, those having a high content of the ≡SiOH groups have a larger effect when the amounts of the compounds to be added are the same. From this viewpoint, (CH$_3$)$_3$SiOH and (CH$_3$CH$_2$)$_3$SiOH are preferred. (C$_6$H$_5$)$_3$—SiOH is also preferred due to its easy handling and stability in the air.

As the compound which generates a compound having one silanol group in a molecule when reacted with moisture, exemplified are derivatives of the compounds of the formula:

(R$^3$)$_3$SiOH wherein R$^3$ is the same as defined above. Specific examples of such the derivatives are those knows as silylating agents such as (CH$_3$)$_3$SiNHSi(CH$_3$)$_3$, (CH$_3$)$_3$SiN(CH$_3$)$_2$,

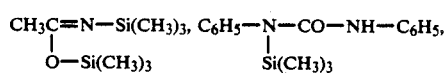

(CH$_3$)$_3$Si—NH—CO—NH—Si(CH$_3$)$_3$,

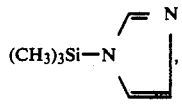

and CF$_3$—SO$_2$—OSi(CH$_3$)$_3$. Among them, (CH$_3$)$_3$SiNHSi(CH$_3$)$_3$ is preferred due to the large content of the ≡SiOH groups of the hydrolyzed compound.

These monovalent silanol compounds improve the tensile properties of the cured material, that is, they decrease the modulus and increase the elongation of the cured material of the polymer composition of the present invention. This is because the monovalent silanol compound reacts with the silicon-containing reactive group of the oxyalkylene base polymer (A) to cap said group, whereby the number of the cross-linking sites in the cured polymer decreases and in turn an average molecular weight between the adjacent cross linked points decreases. This results in the decrease of modulus and increase of elongation.

The amount of the monovalent silanol compound to be added to the composition is generally from 0.1 to 20 parts by weight, preferably from 0.5 to 10 parts by weight per 100 parts by weight of the oxyalkylene base polymer (A), although it is possible to determine the amount of the monovalent silanol compound from the calculation of the silanol group equivalent based on the amount of the silicon-containing reactive group in the oxyalkylene base polymer (A). Usually, the monovalent silanol compound is added in such an amount that the silanol group equivalent is 0.1 to 0.9 times the silicon-containing reactive group. It is preferred that not all the silicon-containing reactive groups are capped with the monovalent silanol compound and at least one silicon-containing reactive group per molecule of the oxyalkylene base polymer (A) remains uncapped. The monovalent silanol compound may be used in an amount more than 0.9 times the silanol group equivalent, but use of the monovalent silanol compound in such large amount is not economical.

In the compound having the silicon-containing group to the silicon atom of which two hydrolyzable groups are bonded and the amino group (hereinafter referred to as "difunctional aminosilane"), a typical example of the silicon-containing group to the silicon atom of which the hydrolyzable groups are bonded is represented by the formula:

wherein $R^2$ is the same as defined above and $X'$ is a hydrolyzable group. Specific examples of the hydrolyzable group are halogen atoms (e.g. chlorine), a hydrogen atom, alkoxy groups (e.g. a methoxy group and an ethoxy group), acyloxy groups (e.g. an acetoxy group), ketoximate groups, (e.g. a dimethylketoximate group), amino groups (e.g. a dimethylamino group), amide groups (e.g. an N-methylacetamide group), aminoxy groups (e.g. a dimethylaminoxy group), mercapto groups (e.g. a thiophenoxy group), alkenyloxy groups (e.g. an isopropenyloxy group), and the like. Among them, the alkoxy groups such as the methoxy group and the ethoxy group are preferred in view of their mild hydrolyzability.

As the amino group, a substituted or unsubstituted amino group can be used. A typical example of the amino group is represented by the formula:

wherein $R^4$ is a hydrogen atom or a substituted or unsubstituted hydrocarbon group, preferably an alkyl group, having 1 to 30 carbon atoms.

Specific examples of the difunctional aminosilane are as follows:

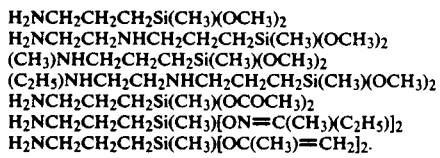

The amount of the difunctional aminosilane to be added to the polymer composition is from 0.1 to 20 parts by weight, preferably 0.5 to 10 parts by weight per 100 parts by weight of the oxyalkylene base polymer (A). Preferably, a weight ratio of the monovalent silanol compound to the difunctional aminosilane is from 1:0.01 to 1:5, more preferably from 1:0.05 to 1:2. Desirably, the amount of the difunctional aminosilane does not exceed that of the monovalent silanol compound.

In the compound having the silicon-containing group to the silicon atom of which three hydrolyzable groups are bonded and an amino group (hereinafter referred to as "trifunctional aminosilane"), a typical example of the silicon-containing group to the silicon atom of which the hydrolyzable groups are bonded is represented by the formula:

wherein $X'$ is the same as defined above. The amino group may be the same as exemplified in connection with the difunctional aminosilane.

Specific examples of the trifunctional aminosilane are as follows:

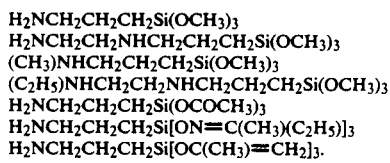

The amount of the trifunctional aminosilane to be added to the polymer composition is from 0.01 to 5 parts by weight, preferably 0.05 to 3 parts by weight per 100 parts by weight of the oxyalkylene base polymer (A). Preferably, a weight ratio of the monovalent silanol compound to the trifunctional aminosilanol is from 1:0.01 to 1:0.75, more preferably from 1:0.02 to 1:0.5, since the modulus of the cured material becomes too high if the amount of the trifunctional aminosilane is too large.

The curable polymer composition of the present invention may contain conventional additives such as a curing accelerator, a plasticizer, a filler and the like.

As the curing accelerator, organic tin compounds, acid phosphates, reaction products of acid phosphates and amines, saturated or unsaturated polybasic carboxylic acids and their anhydrides, organic titanates and the like can be used. Specific examples of the organic tin compounds are dibutyltin dilaurate, dibutyltin dimaleate, dibutyltin phthalate, tin octylate, dibutyltin methoxide, etc. The acid phosphates are phosphates having a residue of the formula:

and include an organic acid phosphate of the formula:

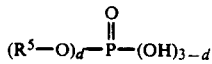

wherein $R^5$ is an organic group and d is 1 or 2. Specific examples of the organic acid phosphate are $(CH_3O)_2$-POOH, $CH_3OPO(OH)_2$, $(C_2H_5O)_2POOH$, C₂H₅OPO(OH)₂, [(CH₃)₂CHO]₂POOH, (CH₃)₂CHOPO(OH)₂, (C₄H₉O)₂POOH, C₄H₉OPO(OH)₂, (C₈H₁₇O)₂POOH, C₈H₁₇OPO(OH)₂, (C₁₀H₂₁O)₂POOH, C₁₀H₂₁OPO(OH)₂, (C₁₃H₂₇O)₂POOH, C₁₃H₂₇OPO(OH)₂, (HO—C₈H₁₆O)₂POOH, HO—C₈H₁₆OPO(OH)₂, (HO—C₆H₁₂O)₂POOH, HO—C₆H₁₂OPO(OH)₂, [CH₂(OH)CH(OH)O]₂POOH, CH₂(OH)CH(OH)OPO(OH)₂, [CH₂(OH)CH(OH)C₂H₄O]₂POOH, CH₂(OH)—CH(OH)C₂H₄OPO(OH)₂, etc.

Specific examples of the organic titanate compound are titanates such as tetrabutyl titanate, tetrapropyl titanate, tetraisopropyl titanate, triethanolamine titanate and the like.

When the curing accelerator is used, it is used in an amount of 0.1 to 10 parts by weight by weight per 100 parts by weight of the oxyalkylene base polymer (A).

As the plasticizer, any of low molecular weight plasticizers such as dioctyl phthalate, high molecular weight plasticizers and viscous plasticizers may be used.

Specific examples of the plasticizer are phthalates (e.g. dibutyl phthalate, diheptyl phthalate, di(2-ethylhexyl) phthalate, butylbenzyl phthalate, butylphthalylbutyl glycolate, etc.), esters of non-aromatic dibasic acids (e.g. dioctyl adipate, dioctyl sebacate, etc.), esters of polyalkylene glycols (e.g. diethyleneglycol dibenzoate, triethyleneglycol dibenzoate, etc.), phosphates (e.g. tricresyl diphosphate, tributyl phosphate, etc.), hydrocarbon base oil (e.g. chlorinated paraffins, alkyl diphenyl, partially hydrogenated terphenyl, etc.) and mixtures thereof. The plasticizer may be added during the preparation of the polymer.

When the plasticizer is used, it is used in an amount of 1 to 150 parts by weight, preferably 10 to 120 parts by weight, more preferably 20 to 100 parts by weight per 100 parts by weight of the oxyalkylene base polymer (A).

The filler may be any of the conventionally used ones, and includes silica such as silica fine powder, calcium carbonate (e.g. heavy or light calcium carbonate, precipitated calcium carbonate, etc.), kaolin, talc, silica, titanium oxide, aluminum silicate, magnesium oxide, zinc oxide, carbon black and the like.

Other additives are anti-sagging agents such as hydrogenated castor oil and organic bentonite, colorants, anti-aging agents, and the like.

The curable polymer composition of the present invention may be used as a sealing agent, a templating material, a castable rubber material, a foaming material, an adhesive, a coating or a water-proofing material.

For example, when the curable composition of the present invention is used as the building sealant, 10 to 300 parts by weight of the inorganic filler such as calcium carbonate, talc or kaolin and optionally the pigments such as titanium oxide and carbon black or the anti-aging agents such as a UV light absorber and an inhibitor of radical chain transfer are added to the composition, well kneaded with a kneader or a paint roll mill and then applied to have the composition exposed to moisture in the air whereby the composition is cured to give the rubbery material having good properties.

PREFERRED EMBODIMENTS OF THE INVENTION

The present invention will be illustrated by following Examples.

PREPARATION EXAMPLE

In an autoclave equipped with a stirrer, polyoxypropylene base polymer 97 % of the molecular ends of which had allyl ether groups (average molecular weight, 8,000) (800 g) was charged and then methyldimethoxysilane (19 g) was added. To this mixture, 0.34 ml of a solution of chloroplatinic acid (H₂PtCl₆.6H₂O) (8.9 g) in a mixture of isopropanol (18 ml) and tetrahydrofuran (160 ml) was added, and the reaction was effected at 80° C. for 6 hours to obtain polyoxypropylene base polymer having 1.7 groups of the formula:

per molecule on the average according to the quantitative analysis of the silicon-containing groups by the NMR analysis. The reaction mixture contained little silicon hydride groups according to the analysis of the amount of residual silicon hydride residues therein by IR spectroscopy.

EXAMPLES 1-3 AND COMPARATIVE EXAMPLES 1-6

To the polymer prepared in the Preparation Example (100 g), calcium carbonate (CCR, the trade name of Shiraishi Industry, Co., Ltd.) (120 g), titanium dioxide (R 820, the trade name of Ishihara Industries, Co., Ltd.) (20 g), diacetylacetonatodibutyltin (U-220, the trade name of Nitto Chemical Co., Ltd.) (2 g) as the curing accelerator, a terminal allyl ether type oxypropylene polymer having $M_n$ of 5,200 and $M_w/M_n$ of 1.6 (50 g) in Examples 1 and 2 of Comparative Examples 1-6 or (2-ethylhexyl) phthalate (50 g) in Example 3, the monovalent silanol compound show in Table 1 (2 g), N-(β-aminoethyl)-γ-aminopropyltrimethoxysilane [H₂NCH₂CH₂NHCH₂CH₂CH₂Si(OCH₃)₃] in an amount shown in Table 1 as the trifunctional aminosilane and N-(8-aminoethyl)-γ-aminopropylmethyldimethoxysilane [H2NCH₂CH₂NHCH₂CH₂CH₂Si(CH₃)(OCH₃)₂] in an amount shown in Table 1 as the difunctional aminosilane were added and well mixed with a three roll mill. Then, an H-shaped test specimen was prepared from the mixture according to JIS A 5758 and tested on its tensile properties, bond strength and weather resistance of the bond strength under illumination (weathering bond strength) in the following manners:

TENSILE PROPERTIES

The H-shaped test specimen prepared according to JIS A 5758 with the use of an anodized aluminum plate as a substrate is aged at 23° C., 64 %RH for 14 days and further at 30° C. for 14 days. Then, tensile test is done at a pulling rate of 30 mm/min.

BOND STRENGTH

The breaking state of the test specimen in the tensile property test is observed.

When the cured material itself is broken (cohesive failure), the bond strength between the cured composition and the substrate is strong. When the cured material is peeled off at the interface between the cured material and the substrate (adhesive failure), the bond strength is weak.

WEATHERING BOND STRENGTH

After accelerated weathering of the H-shaped test specimen prepared according to JIS A 5758 with the use of a glass plate as a substrate for 480 hours by means of the Sunshine weatherometer (manufactured by Suga Testing Machine Co., Ltd), the test specimen is subjected to the tensile test by means of the autographic recording machine (IS-5000 manufactured by Shimadzu)

The results are shown in Table 1.

TABLE 1

| Example No. | Monovalent Silanol compound | Trifunctional aminosilane (g)/ difunctional aminosilane (g) | Tensile properties | | | Bond strength to aluminum | Weathering bond strength | | |
|---|---|---|---|---|---|---|---|---|---|
| | | | $M_{100}$*1 (kg/cm²) | $T_B$*1 (kg/cm²) | $E_B$*1 (%) | | $T_B$*1 (kg/cm²) | $E_B$*1 (%) | Breaking state |
| 1 | OSi(CH₃)₃<br>\|<br>CH₃C≡NSi(CH₃)₃ | 0.1/2.0 | 2.9 | 8.3 | 460 | CF | 8.0 | 420 | CF |
| 2 | H<br>\|<br>(CH₃)₃SiNSi(CH₃)₃ | 0.5/2.0 | 2.9 | 7.9 | 420 | CF | 7.7 | 400 | CF |
| 3 | (CH₃)₃SiOC₆H₅ | 0.5/2.0 | 2.8 | 7.8 | 440 | CF | 7.2 | 380 | CF |
| C.1 | — | 0.5/2.0 | 3.9 | 8.2 | 460 | CF | 8.1 | 440 | CF |
| C.2 | H<br>\|<br>(CH₃)₃SiNSi(CH₃)₃ | 2.0/0 | 5.3 | 9.1 | 330 | CF | 8.9 | 300 | CF |
| C.3 | ↑ | 0/2.0 | 2.8 | 8.1 | 440 | CF | 1.9*2 | 120*2 | AF |
| C.4 | ↑ | 0/0 | — | 2.0*2 | 90*2 | AF | 0.9*2 | 60*2 | AF |
| C.5 | — | 0/2.0 | 4.7 | 9.2 | 400 | CF | 1.5*2 | 110*2 | AF |
| C.6 | — | 2.0/0 | 5.8 | 9.6 | 320 | CF | 8.1 | 290 | CF |

Note:
*1 $m_{100}$: 100% modulus (tensile stress at 100% elongation). $T_B$: Tensile stress at break. $E_B$: Elongation at break.
*2 These values do not correctly represent the tensile properties of the cured material, since the cured material was peeled off at the adhered interface.

The overall evaluation of the materials in Examples 1–3 and Comparative Examples 1–6 is shown in Table which "A" stands for good and "B" stands for poor.

TABLE 2

| Exam. No. | Monovalent silanol compound | Trifunctional aminosilane/ difunctional aminosilane | Modulus | Bond strength | Weathering bond strength |
|---|---|---|---|---|---|
| 1 | Yes | 0.1/2.0 | A | A | A |
| 2 | Yes | 0.5/2.0 | A | A | A |
| 3 | Yes | 0.5/2.0 | A | A | A |
| C.1 | No | 0.5/2.0 | B | A | A |
| C.2 | Yes | 2.0/0 | B | A | A |
| C.3 | Yes | 0/2.0 | A | A | B |
| C.4 | Yes | 0/0 | — | B | B |
| C.5 | No | 0/2.0 | B | A | B |
| C.6 | No | 2.0/0 | B | A | A |

What is claimed is:

1. A curable polymer composition comprising: (A) 100 parts by weight of an oxyalkylene base polymer having bonded to the backbone at least one silicon-containing group of the formula (I)

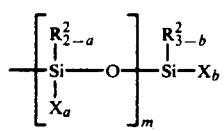

wherein R₂ is a substituted or unsubstituted C₁–C₄₀ organic group;
X is a hydroxyl group or a hydrolyzable group;
a is 0, 1 or 2;
b is 0, 1, 2 or 3; and
m is an integer of 0 to 19,
provided that when two or more R² groups are present, they may be the same or different, that when two or more X' substituents are present, they may be the same or different, that the sum of a and b is not less than one, that when m is not less than 2, the kinds of the repeating units in the brackets may be the same or different, (B) 0.1 to 20 parts by weight of at least one compound selected from the group consisting of a compound of the formula (R³)₃SiOH and a compound which, when reacted with moisture, generates a compound (R³)₃SiOH, wherein the R³ groups are the same or different and are substituted or unsubstituted alkyl group having 1 to 20 carbon atoms or a substituted or unsubstituted aryl group having 6 to 20 carbon atoms, (C) 0.1 to 20 parts by weight of a compound having a silicon-containing

wherein R² is defined as above and X' is a hydrolyzable group, and (D) 0.01 to 5 parts by weight of a compound having a silicon-containing group SiX₃' and an amino group, wherein X' is a hydrolyzable group.

2. The curable polymer composition according to claim 1, wherein the backbone of the oxyalkylene base polymer (A) comprises repeating units of the formula:

—R¹—O— wherein R¹ is a substituted or unsubstituted divalent hydrocarbon group having 1 to 12 carbon atoms.

3. The curable polymer composition according to claim 2, wherein R¹ is —CH(CH₃)—CH₂—.

4. The curable polymer composition according to claim 1, wherein X in the formula (I) is a hydrogen atom, a halogen atom, a hydroxyl group, an alkoxy group, an acyloxy group, a ketoximate group, an amino group, an amido group, an aminoxy group, a mercapto group or an alkenyloxy group, and when two or more X groups are present, they may be the same or different.

5. The curable polymer composition according to claim 4, wherein X in the formula (I) is the alkoxy group.

6. The curable polymer composition according to claim 5, wherein X is a methoxy group.

7. The curable polymer composition according to claim 1 wherein the compound B is a compound of the formula:

$(R^3)_3 SiOH$ wherein the $R^3$ groups are the same or different and are substituted or unsubstituted alkyl group having 1 to 20 carbon atoms or a substituted or unsubstituted aryl group having 6 to 20 carbon atoms.

8. The curable polymer composition according to claim 1, wherein the compound B is a compound which, when reacted with moisture, generates a compound of the formula:

$(R^3)_3SiOH$ wherein the $R^3$ groups are the same or different and are substituted or unsubstituted alkyl group having 1 to 20 carbon atoms or a substituted or unsubstituted aryl group having 6 to 20 carbon atoms.

9. The curable polymer composition according to claim 1, where the X in the compound (C) is $-NH_2$.

10. The curable polymer composition according to claim 1, wherein the amino group in the compound (D) is $-NH_2$.

* * * * *